US012630232B2

(12) United States Patent (10) Patent No.: US 12,630,232 B2
Souvay (45) Date of Patent: May 19, 2026

(54) CONNECTION OF BODY ELEMENTS IN MOTOR VEHICLES

(71) Applicant: SIKA TECHNOLOGY AG, Baar (CH)

(72) Inventor: Denis Souvay, Illkirch (FR)

(73) Assignee: SIKA TECHNOLOGY AG, Baar (CH)

( * ) Notice: Subject to any disclaimer, the term of this patent is extended or adjusted under 35 U.S.C. 154(b) by 384 days.

(21) Appl. No.: 18/563,970

(22) PCT Filed: Jul. 12, 2022

(86) PCT No.: PCT/EP2022/069391

§ 371 (c)(1),
(2) Date: Nov. 24, 2023

(87) PCT Pub. No.: WO2023/285423

PCT Pub. Date: Jan. 19, 2023

(65) Prior Publication Data

US 2025/0340248 A1 Nov. 6, 2025

(30) Foreign Application Priority Data

Jul. 15, 2021 (EP) .................................... 21185915

(51) Int. Cl.
B62D 27/02 (2006.01)
(52) U.S. Cl.
CPC ................................. B62D 27/026 (2013.01)
(58) Field of Classification Search
CPC .. B62D 27/023; B62D 27/026; B62D 29/005; B62D 29/008; B62D 29/048
(Continued)

(56) References Cited

U.S. PATENT DOCUMENTS 9,567,013 B2 * 2/2017 Ehrlich ................. F16B 17/004
9,702,391 B2 * 7/2017 Erlacher .............. B62D 23/005
(Continued)

FOREIGN PATENT DOCUMENTS

DE 102011116626 A1 * 4/2013 ........... B62D 29/005
WO 2018/234477 A1 12/2018

OTHER PUBLICATIONS

Sep. 29, 2022 International Search Report issued in International Patent Application No. PCT/EP2022/069391.
(Continued)

*Primary Examiner* — Jason S Daniels
(74) *Attorney, Agent, or Firm* — Oliff PLC

(57) ABSTRACT

A system of connected body elements for a motor vehicle, the system including: a first body element; a second body element, wherein the body elements are arranged with respect to one another such that there is a gap between the body elements; an adhesive which is arranged at least partially in the gap and adhesively bonds the first body element to the second body element. At least one attachment element is arranged on at least one of the body elements such that the attachment element divides the gap into a channel and a shoulder lying next to the channel, wherein the adhesive is at least partially arranged in the channel and at least partially on the shoulder, and wherein a connection region directly adjoining the shoulder is free of adhesive, and wherein the attachment element does not completely seal the gap between the body elements.

15 Claims, 5 Drawing Sheets

Figure 1:
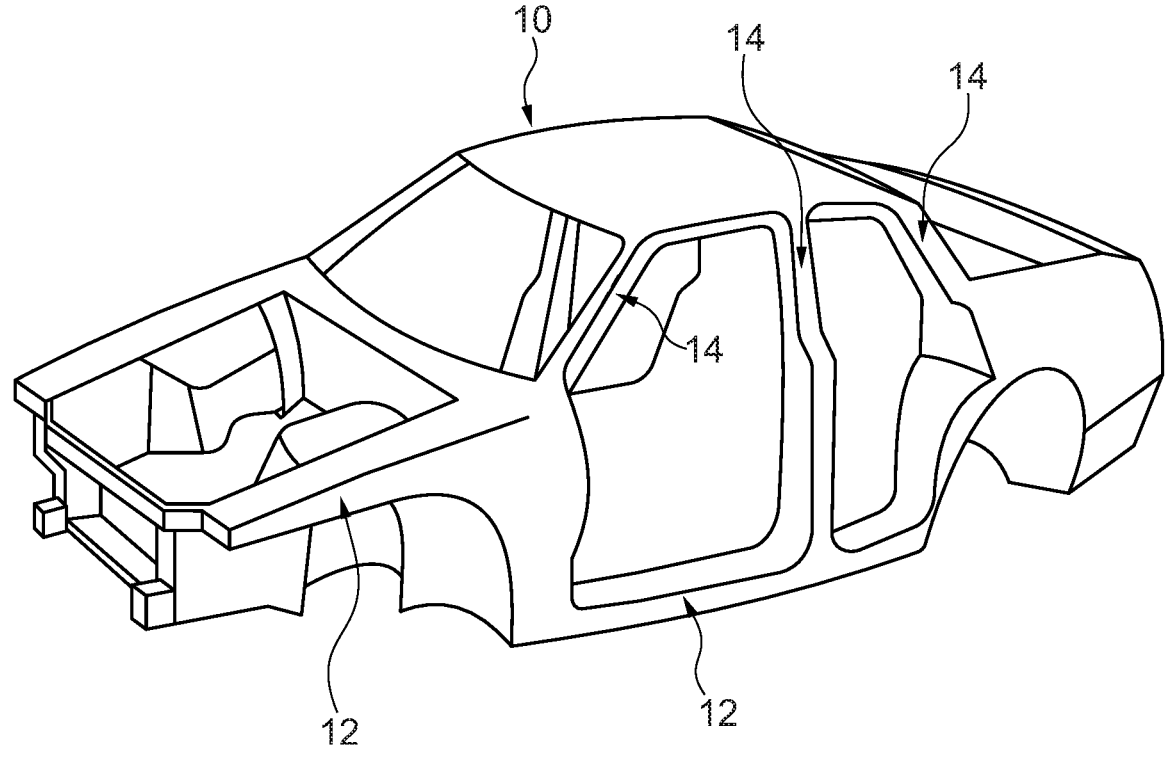

(58) Field of Classification Search
USPC ................................................... 296/29, 205
See application file for complete search history.

(56) References Cited

U.S. PATENT DOCUMENTS

| 11,697,249 | B2 * | 7/2023 | Schulte | B29C 66/532 |
| | | | | 156/295 |
| 11,772,713 | B2 * | 10/2023 | Citti | B62D 27/023 |
| | | | | 296/205 |
| 2005/0212297 | A1 | 9/2005 | McPherson | |
| 2012/0235401 | A1 | 9/2012 | Richardson et al. | |
| 2014/0301775 | A1 * | 10/2014 | Ehrlich | F16B 17/004 |
| | | | | 403/267 |
| 2016/0017909 | A1 | 1/2016 | Erlacher et al. | |
| 2022/0144349 | A1 * | 5/2022 | Quaderer | B62D 27/026 |

OTHER PUBLICATIONS

Jan. 16, 2024 International Preliminary Report on Patentability issued in International Patent Application No. PCT/EP2022/069391.

* cited by examiner

CONNECTION OF BODY ELEMENTS IN MOTOR VEHICLES

The invention concerns a system of connected body elements for motor vehicles, and a method for connection of body elements in motor vehicles.

Body elements, such as for example extruded profiles, castings or panels, are often bonded together for connection. Firstly, adhesives are used which are applied to a first element as adhesive beads, wherein a second element to be bonded is then placed on this adhesive bead so that the two body elements can be bonded. Such known methods however have the disadvantage that handling the body elements to be bonded, and the application of adhesive, are firstly complex and secondly have certain restrictions. For example, it is difficult to bond nested elements together using this method. This is because the adhesive bead applied to the first element may be scraped off when the second element is fitted, and may hence no longer be present at the desired position for bonding the elements together.

A further method for bonding elements in body construction of motor vehicles provides that—in particular for nested body elements—a liquid adhesive is injected into a closed chamber in order to thereby bond together the elements to be bonded. A disadvantage of this method is that fluid-tightly closed cavities must be created, which predefine a space for the liquid adhesive. This can be achieved for example with seals and requires elements with very small production tolerances. As a result, such systems are complex and costly to produce.

To overcome these disadvantages, WO2018/234477A1 has proposed a system in which no fluid-tight cavities have to be provided for bonding together two components. An open intermediate space is filled with adhesive by means of channels which are integrated in the components. The adhesive is designed in such a manner that it solidifies on shoulders next to the channels such that uncontrolled spreading of the adhesive can be prevented. However, this system or this method has the disadvantage that the components to be bonded together are complicated and therefore expensive to produce. In particular, the formation of the channels in the components necessitates a high outlay on the production thereof.

The invention is therefore based on the object of providing an improved system of connected body elements for motor vehicles, or an improved method for connection of body elements in motor vehicles, which allows body elements in motor vehicles to be connected together more economically.

This object is initially achieved by a system of connected body elements for a motor vehicle, the system comprising a first body element; a second body element, wherein the body elements are arranged with respect to one another such that there is a gap between the body elements; an adhesive which is arranged at least partially in the gap and adhesively bonds the first body element to the second body element. In this case, at least one attachment element is arranged on at least one of the body elements such that the attachment element divides the gap into a channel and a shoulder lying/arranged next to the channel, wherein the adhesive is arranged at least partially in the channel and at least partially on the shoulder, and wherein a connection region directly adjoining the shoulder is free of adhesive, and wherein the attachment element does not completely seal the gap between the body elements.

The solution proposed here firstly has the advantage that the use of attachment elements for forming the channels and shoulders makes it possible to use advantageous standard body components which do not require any separate processing steps for forming the channels.

Compared to solutions having sealed adhesive spaces, the solution proposed here has the advantage that, for connection of body elements in motor vehicles, no fluid-tightly closed space need be provided for the adhesive, but a cheaper open system may be used which is easier to handle and has no fluid-tightly closed intermediate spaces. Thus body elements may be used which have no seals, which corresponds to a substantial cost advantage. Furthermore, the present invention allows even parts with greater production tolerances to be bonded or connected together because no fluid-tightly closed spaces need be provided for the adhesive. This also corresponds to a substantial cost benefit in comparison with the known systems, because as a result, the various elements of the system can be produced with larger production tolerances, leading to cost advantages. Also, a process of connecting the body elements is easier to implement since filling closed spaces with adhesive entails difficulties which may hereby be avoided, in particular the displacement of air in the closed cavity by the adhesive.

A core concept of the present invention is that by the use of a suitable adhesive, an open system for connecting body elements in motor vehicles may be used. It has namely been observed that with a suitable adhesive, a self-sealing system can be created, on condition that suitably dimensioned channels with adjacent shoulders are provided.

The adhesive is configured such that on cooling, it has a sharp transition between a non-hardened and a hardened state. This allows components of an open system described here to be bonded with such a suitable adhesive.

The channels are dimensioned such that the adhesive flowing through the channels cools comparatively slowly. This is achieved in particular in that a surface area of the channels is configured so as to be relatively small in comparison with a volume of the channels.

In contrast, in the region between the shoulder and the second body element, the adhesive cools comparatively more quickly. This is achieved in particular in that in this region, a surface area is designed relatively larger in comparison with a volume of this region.

Such a dimensioning of the open system now has the consequence that the adhesive applied in the heated state cools more quickly on the shoulders than in the channel. This leads to a faster hardening of the adhesive on the shoulders than in the channels, and hence to a reliable, self-closing system.

With suitable provision of such channels, now the adhesive introduced into the channels can be distributed in the intermediate space between the first and second body elements, and a self-closing system is created by suitable provision of shoulder regions next to the channels.

The term "open" or "open cavity" in the context of this invention means "fluid-permeable" or "not sealed".

In an exemplary embodiment, the attachment element is formed integrally.

In an alternative embodiment, the attachment element comprises a plurality of separate components.

In an exemplary refinement, the attachment element comprises an annular component and a stopper-shaped component, or the attachment element comprises two annular components, or the attachment element comprises two stopper-shaped components.

In an exemplary embodiment, the attachment element is formed from plastic, also called synthetic material, in particular from PA.

In an exemplary embodiment, the attachment element is a pre-manufactured, in particular injection-molded, plastic.

In an alternative embodiment, the attachment element is an, in particular extruded, plastic, formed directly on the at least one body element.

In an exemplary embodiment, the attachment element also comprises an expandable material for sealing a cross-section.

This has the advantage that the attachment element can thereby be used both for forming a channel and for sealing a cross-section (as what is referred to as a baffle).

In an exemplary embodiment, the first body element is a profile, a casting or a panel-shaped element, and the second body element is a profile, a casting or a panel-shaped element.

Bodies of motor vehicles are normally constructed from such elements. Various combinations of such elements which are to be connected together may occur. A main advantage of the present invention is that the system for connection of body elements proposed here can be applied universally to widely varying elements, irrespective of their shaping, material or production method. Thus this system may be applied universally in bodywork of motor vehicles.

The term "panel-shaped element" in the context of this invention expressly comprises both elements made of metal and elements made of plastic or fiber-reinforced plastic. This term therefore refers solely to the shape and not to the material of the element.

The term "profile" in the context of this invention expressly comprises elements produced in different ways. For example, this means extrusion profiles, internal high-pressure forming profiles, or rolled panel-shaped elements.

The term "casting" in the context of this invention expressly includes elements which are produced in various ways. Examples are elements produced by dead-mold casting, ingot casting or continuous strand casting.

In an exemplary embodiment, the first body element and/or the second body element consists at least partially of metal, plastic or fiber-reinforced plastic.

In a preferred refinement, the first and/or the second body element consists at least partially of polyamide, in particular PA 6.6 (nylon).

In a preferred refinement, the first and/or the second body element consists at least partially of steel, aluminum or magnesium, or of combinations of these metals.

In an alternative preferred refinement, the first body element and/or the second body element consists at least partially of fiber-reinforced plastics from the group CFRP, GFRP or SMC.

One advantage of the system proposed here is in particular the fact that different materials and material combinations can be connected together.

In an exemplary embodiment, a distance between the shoulder and the opposite body element is between 0.2 and 5 mm, preferably between 0.5 and 4 mm, particularly preferably between 1 and 3 mm.

Such a distance between the shoulder and the opposite body element ensures that, in this region of the open cavity, the adhesive cools and therefore hardens more quickly than in the region of the channels, so that the adhesive is distributed through the channels but cools and hardens in the regions of the shoulders and thereby seals the cavity.

Depending on the composition and application parameters (e.g. temperature or extrusion speed) of the adhesive, the distance between the shoulder and the opposite body element may be selected differently in order to achieve a desired sealing effect of the adhesive in this region. Also, this distance between the shoulder and the opposite body element may be used to influence an adhesion area between the first body element and the second body element, wherein a larger distance would lead to a larger adhesion area and a smaller distance to a smaller adhesion area. Depending on whether the priority lies on making the mechanical connection between the body elements as strong as possible, or whether as little adhesive as possible should be used, a suitable solution may be selected here.

In an exemplary embodiment, the distances between the shoulder and opposite body element in the case of two shoulders on either side of the channel are equal in size.

In an alternative embodiment, these distances differ in size, the two distances moving within a frame which, according to the above description, enables the adhesive to stop on the shoulders.

In an exemplary embodiment, a channel width is between 5 and 300 mm, preferably between 10 and 70 mm, particularly preferably between 10 and 30 mm.

Naturally, the channel need not be linear over its entire length, but it may also be curved or have various direction changes.

In general, the channel serves for the rough distribution of the adhesive in the provided for bonding intermediate region between the first and second body elements. In an exemplary embodiment, a channel depth is between 0.5 and 10 mm, preferably between 1 and 8 mm, particularly preferably between 2 and 5 mm.

In an exemplary embodiment, a channel length is between 50 and 500 mm, preferably between 70 and 400 mm, particularly preferably between 100 and 300 mm.

Such dimensioning of the channel has the advantage that, as a result, the adhesive cools so slowly on flowing through the channel that the adhesive is distributed over substantially the entire length of the channel, in order thereby to be able to bond the first body element and second body element together reliably.

The channel may have a constant cross-section; in an alternative embodiment however, the channel may also have a non-constant cross-section. The length, width and depth of the channel may be made non-constant. Thus for example, channels can also be produced which are not as deep at the ends as in the middle of the channel (for example, below a filling opening), or channels which have an oval shape in plan view.

Thus a different channel geometry may be advantageous depending on the requirements of the respective application.

Depending on composition and application parameters of the adhesive, the dimensions of the channel in said regions may be adapted to achieve an optimal result. It is desirable that the adhesive only completely cools or hardens in the channel after the desired distribution of the adhesive in the space between the first body element and the second body element has been achieved.

In an exemplary embodiment, the channel has a V-shaped or U-shaped cross-section, or an angular or semicircular form or cross-section.

A suitable cross-sectional form of the channel may be selected depending on how quickly the adhesive should flow through the channel and how quickly the adhesive should cool and hence harden in the channel. In principle, the adhesive cools more quickly, the larger the contact area. Thus the adhesive will cool more slowly in a semicircular form than in a rectangular cross-sectional form.

In an exemplary embodiment, the channel runs transversely or substantially transversely to a longitudinal direction of the first body element.

In an alternative embodiment, the channel runs along or substantially along a longitudinal direction of the first body element.

In a further exemplary embodiment, the channel runs completely around the first body element and is thus closed in itself.

In a further exemplary embodiment, the channel has branches.

In a further exemplary embodiment, the channel comprises a main channel and side channels connected thereto. The arrangement and design of the channel or channels depends on the points at which the first body element is to be bonded to the second body element. To this end, channels which run completely around the reinforcing element may be provided, several channels which are formed separately from each other may be provided, or channels with branches or side channels may be provided. In particular, side channels may be used to enlarge the adhesive area between the first body element and the second body element.

In an exemplary embodiment, a width of the shoulder measured in the same direction as the channel width is less than 30 mm, preferably less than 20 mm, particularly preferably less than 10 mm, particularly preferably less than 5 mm.

The provision of a shoulder with these dimensions has the advantage that thereby a bonding of the first body element to the second body element can be achieved which requires a small quantity of adhesive.

A suitable width of the shoulder may be selected accordingly depending on the requirements and starting situation. To ensure that the spreading of the adhesive on the shoulder is stopped, for example the hardening behavior of the adhesive may be influenced by corresponding adaptation of the adhesive composition, or by a modified adhesive temperature or injection speed on introduction of the adhesive into the channel, or by adaptation of the distance between the shoulder and the structural element.

In an exemplary embodiment, a width of a connection region, measured in the same direction as the channel width, is more than 1 mm, preferably more than 20 mm, particularly preferably more than 30 mm, particularly preferably more than 40 mm.

In an exemplary embodiment, the shoulder and the connection region lie in the same plane.

In an alternative embodiment, the shoulder and the connection region do not lie in the same plane.

Since the connection region is not covered with adhesive, the form of this connection region is irrelevant for the bonding. The essential factor is only that a space between the shoulder and the opposite body element, and a space between the connection region and the opposite body element, are open towards each other.

In a preferred embodiment, the first or the second body element has a filling opening for introduction of adhesive into the channel.

The advantage of such a filling opening is that the adhesive may be introduced directly into the channel.

In a preferred refinement, the filling opening opens directly into the channel. The filling opening may be arranged centrally with respect to a length and/or width of the channel.

In an exemplary embodiment, the first body element and the second body element are at least partially connected together for pre-fixing of the first and second body elements before the adhesive is introduced. In a preferred embodiment, the body elements are pre-fixed by a unilateral or bilateral mechanical joining method, in particular by riveting, welding, clips (e.g. snap-closure clips), screwing or bolting.

In an exemplary embodiment, the first body element and the second body element are both profiles. For example, these profiles have differently sized cross-sections so that the smaller profile can be inserted in the larger profile.

In a further exemplary embodiment, the first and second body elements are formed respectively as a profile and a panel-shaped element.

In a further exemplary embodiment, the first and second body elements are formed respectively as a casting and a profile. For example, the casting may have an opening in which the profile can be inserted.

In a further exemplary embodiment, the first and the second body elements are both castings. For example, one of the castings may have an opening in which part of the second casting can be inserted.

In a further exemplary embodiment, the first and the second body elements are both panel-shaped elements.

In a further exemplary embodiment, the first and second body elements are respectively a panel-shaped element and a casting. For example, two panel-shaped elements with a U-shaped cross-section may be welded or bonded together to form a cavity. The casting may for example be arranged in this cavity.

It is self-evident that also more than two body elements may be bonded together.

An essential advantage of the system proposed here is that very differently shaped body elements can be connected together, because attachment elements for forming channels and shoulders can be provided on any arbitrary element. This allows a versatile use of the system of connected body elements for motor vehicles proposed here.

The object cited initially is furthermore achieved by a method for connecting body elements in a motor vehicle. The method comprises the steps: provision of a first body element; provision of a second body element; arrangement of an attachment element on at least one of the body elements; arrangement of the first body element and the second body element such that a gap is formed between the body elements, and that this gap is divided by the attachment element at least into a channel and a shoulder lying next to the channel; introduction of an adhesive into the channel; and spreading of the adhesive at least partly in the channel and at least partly on the shoulder for bonding the first body element to the second body element, wherein the spreading of the adhesive on the shoulder is stopped.

The method proposed here again offers the same advantages as have already been described with reference to the system of connected body elements proposed here. In particular, the method for bonding body elements may thereby be configured so as to be more economical and with simpler handling.

In an exemplary embodiment, the spreading of the adhesive on the shoulder is stopped by an at least partial hardening of the adhesive on the shoulder.

In an exemplary embodiment, during the arrangement of the attachment element, the attachment element is plugged onto the at least one body element.

In an alternative embodiment, during the arrangement of the attachment element, the attachment element is extruded onto the at least one body element.

In an exemplary embodiment, the method comprises the further step: hardening of the adhesive by application of a temperature of at least 120° C., preferably of at least 140° C., particularly preferably of at least 160° C.

For example, the adhesive may be hardened in an oven as normally used in electrophoretic deposition painting (EDP) of the body. Normally, temperatures between 120° C. and 220° C. prevail in such ovens. Such temperatures are particularly suitable for the hardening of adhesives which may be used in connection with this invention. Since the body with the connected body elements and hardened adhesive in any case passes through the process of deposition painting and subsequent heat application for hardening of the paint, a use of this heat application in the oven after deposition painting for hardening the adhesive is particularly advantageous.

In an exemplary embodiment, on introduction into the channel, the adhesive is conveyed from an adhesive tank by a pump.

In an exemplary embodiment, on introduction into the channel, the adhesive is conveyed through a filling opening in the first or in the second body element.

The provision of a filling opening in the first or second body element has the advantage that in this way the adhesive can easily be introduced into the channel, for example by robots.

Adhesive

The adhesive composition described below is an exemplary adhesive which may be used in connection with this invention.

A thermosetting, one-component epoxy compound was produced according to table 1.

TABLE 1

| Raw materials used | |
|---|---|
| Raw materials | Parts by weight |
| Epoxy liquid resin, D.E.R. 331 (bisphenol-A-diglycidyl ether), Dow | 50 |
| Polyester polyol, Dynacol 7380, Degussa AG, Germany | 5 |
| Reactive thinners, hexanediol-glycidyl ether, Denacol EX-212, Nagase America | 1 |
| Viscosity improver D-1 | 34 |
| Hardener, dicyandiamide | 4.78 |
| Accelerant, substituted urea | 0.22 |
| Pyrogenic silicic acid | 5 |

Production of a Viscosity Improver ("D-1")

150 g poly-THF 2000 (OH number 57 mg/g KOH) and 150 Liquiflex H (OH number 46 mg/g KOH) were dried for 30 minutes under vacuum at 105° C. After the temperature had been reduced to 90° C., 61.5 g IPDI and 0.14 g dibutyl tin dilaurate were added. The reaction was conducted under vacuum at 90° C. until the NCO content remained constant at 3.10% after 2.0 h (calculated NCO content: 3.15%). Then 96.1 g cardanol were added as a blocking agent. Agitation continued at 105° C. under vacuum until no more free NCO could be found. The product was then used as the viscosity improver D-1. The following raw materials were used:

Poly-THF 2000 (difunctional polybutylene glycol) (OH equivalent weight = approx. 1000 g/OH equivalent), BASF
Liquiflex H (hydroxyl-terminated polybutadiene) (OH equivalent weight = approx. 1230 g/OH equivalent), Krahn
Isophorone diisocyanate (="IPDI"), Evonik
Cardolite NC-700 (cardanol, meta-substituted alkenyl-mono-phenol), Cardolite Production of Master Batch The polyester polyol, at around 40° C. above its softening point of 77° C. (approx. 100-140° C.), was mixed with liquid epoxy resin for around 30 minutes until a clear mixture resulted (approx. 33 wt. % polyester polyol relative to the total weight of the master batch). The master batch was then cooled to around 100° C.

Production of Thermosetting One-Component Epoxy Compound:

The other components of the epoxy compound were mixed into a homogenous mass, preferably at temperatures of around 50 to 90° C. As soon as the mixture was homogeneous, the master batch was added in liquid form (temperature of master batch 100° C.) and mixed immediately.

The thermosetting one-component epoxy compound was injected at a temperature of 60° C. and an injection rate of 50 ml/min.

Figure 2:
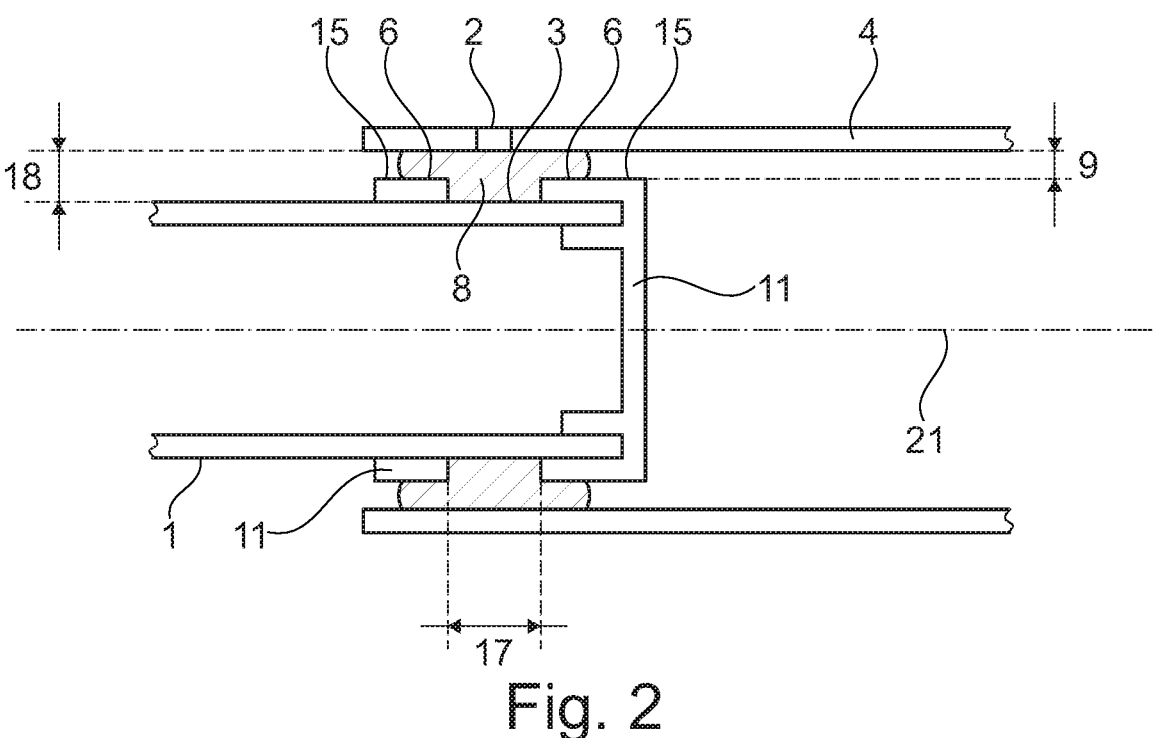
Figure 3:
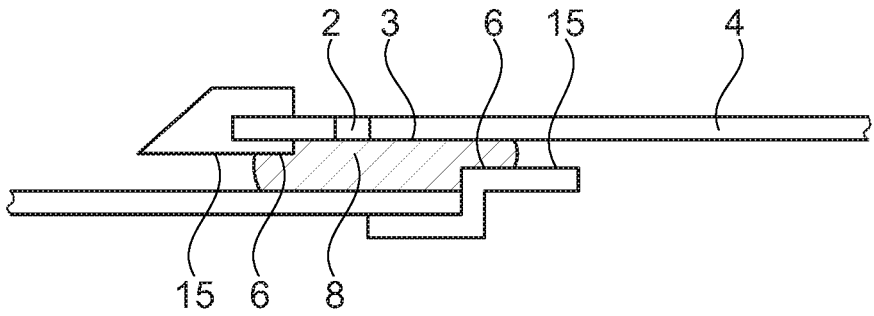
Figure 3:
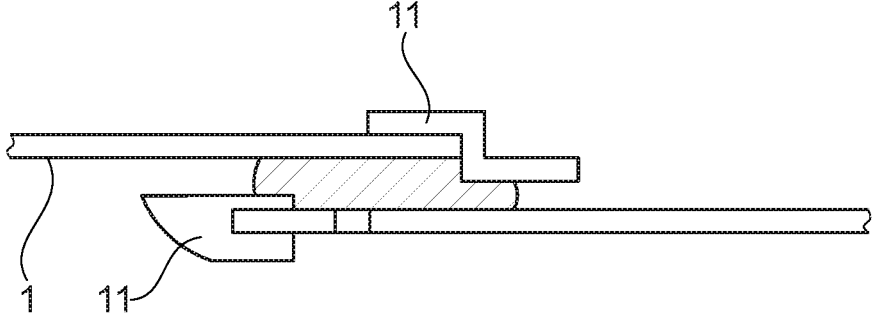
Figure 4A:
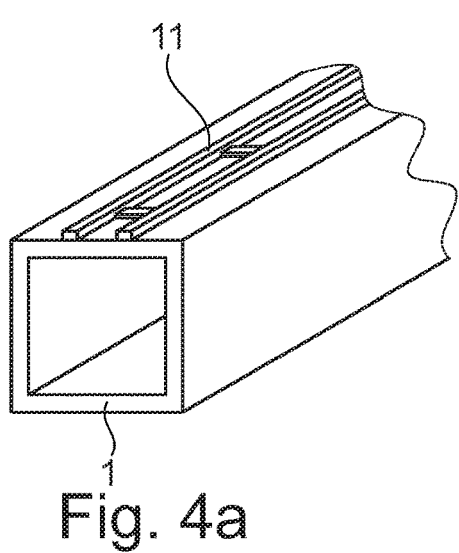
Figure 4B:
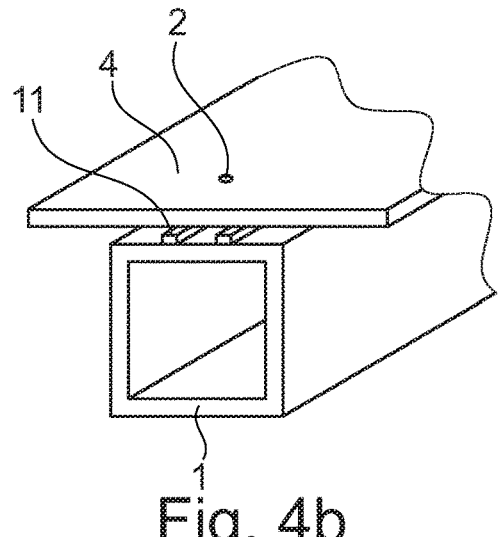
Figure 4C:
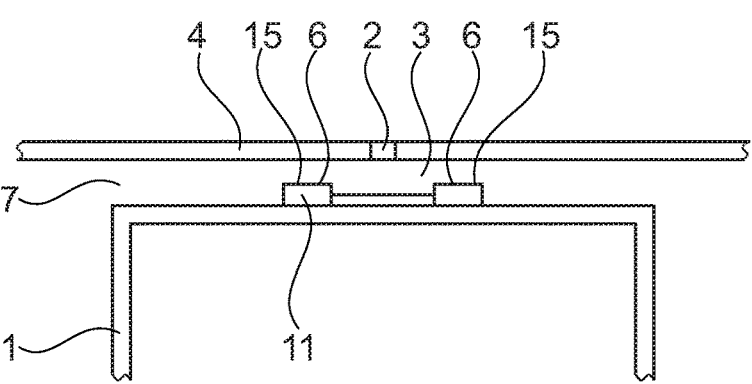
Figure 5A:
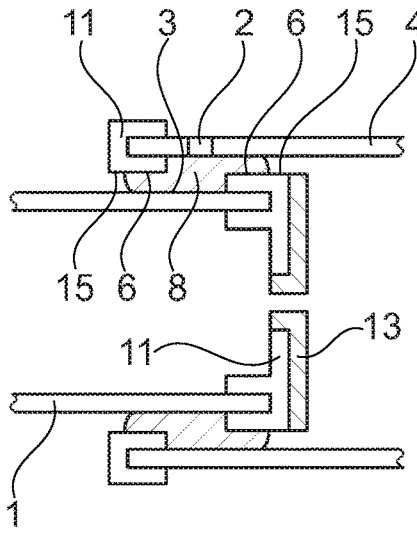
Figure 5B:
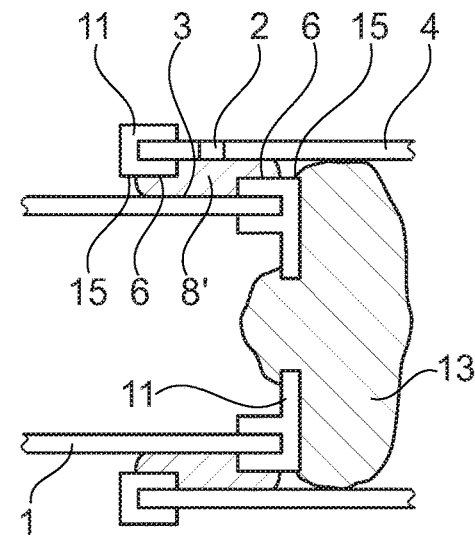
Figure 6A:
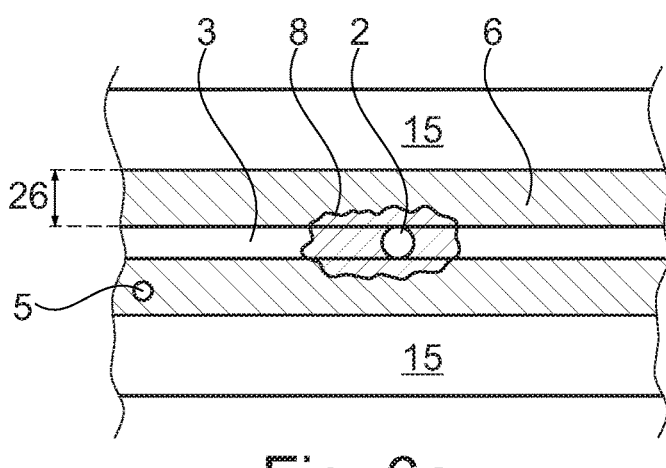
Figure 6B:
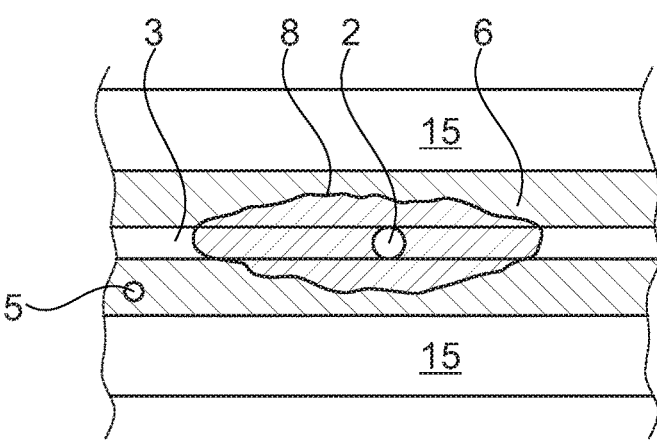
Figure 6C:
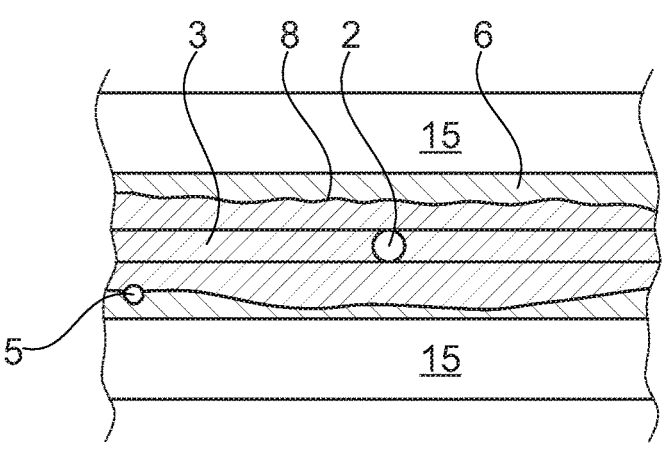
Figure 7:
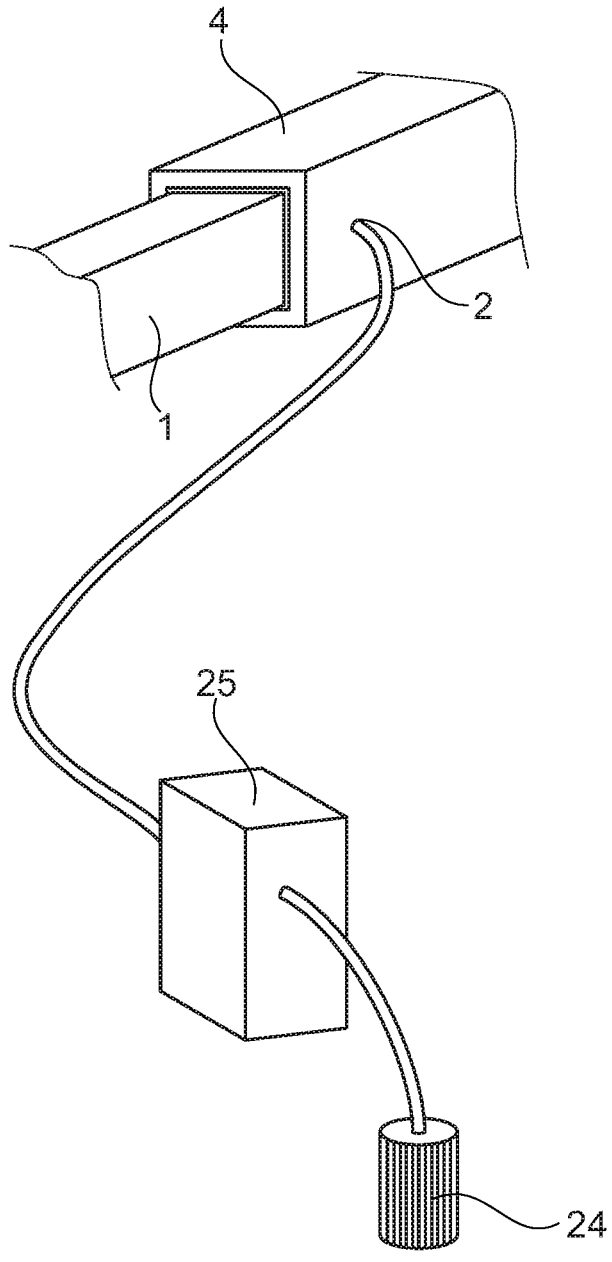

Details and advantages of the invention are described below in relation to exemplary embodiments and with reference to diagrammatic drawings. The drawings show:

FIG. 1 an exemplary depiction of a body of a motor vehicle;

FIG. 2 a diagrammatic depiction of an exemplary system of connected body elements in cross-section;

FIG. 3 a diagrammatic depiction of an exemplary system of connected body elements in cross-section;

FIGS. 4a to 4c a diagrammatic depiction of an exemplary combination of a first and a second body element with an attachment element arranged in between;

FIGS. 5a and 5b a diagrammatic depiction of an exemplary system of connected body elements in cross-section;

FIGS. 6a to 6c a diagrammatic depiction of an exemplary introduction of an adhesive into an intermediate space between a first and a second body element; and FIG. 7 a diagrammatic depiction of an introduction device.

FIG. 1 shows diagrammatically a body 10 of a motor vehicle. The body 10 comprises various structures, such as for example pillars 14 and cross struts 12. These and other structures of the body 10 must be connected together in a suitable fashion. In particular, profiles, castings and panel-shaped elements may be connected together.

FIG. 2 diagrammatically depicts a cross-section of a system 1 of connected body elements 1, 4. In this case, in a gap between the two body elements 1, 4, there is arranged an attachment element 11 which divides this gap into a channel 3 and a shoulder 6 lying/arranged next to the channel 3. A connection region 15 is arranged in each case next to the shoulder 6. Here, in order to connect the body elements 1, 4, adhesive 8 is spread in the channel 3 and on the shoulders 6, the adhesive being able to be filled into the channel 3 through an opening 2.

In this exemplary embodiment, the attachment element 11 is plugged or pushed onto the first body element 1. Furthermore, in this exemplary embodiment, the attachment element 11 consists of an annular component and a stopper-shaped component.

A distance 9 between the shoulder 6 and second body element 4 is selected here in such a manner that the adhesive 8 comes to stop on the shoulder 6 without flowing onto the connection region 15 next to the shoulder 6. The channel 3 has a channel width 17 and a channel depth 18 which are selected in such a manner that the adhesive 8 can flow through a designated section of the channel 3 without the adhesive 8 coming to a stop in the process.

FIG. 3 in turn diagrammatically depicts a cross-section of a system 1 of connected body elements 1, 4. In contrast to the system 1 in FIG. 2, here the attachment element 11 is arranged both on the first body element 1 and on the second body element 4. As a result, the channel 3 and the shoulders 6 lying/arranged beside it are formed between the two components of the attachment element 11.

FIGS. 4a to 4c show a diagrammatic depiction of an exemplary combination of a first body element 1 and a second body element 4 with an attachment element 11 arranged in between. In this exemplary embodiment, the attachment element 11 is extruded on the first body element 1. In this case, the attachment element 11 comprises two ribs which run parallel and are connected to each other at certain distances by transversely running webs. These ribs form the channel 3 and also the shoulders 6 and the connection regions 15 (FIG. 4c).

FIGS. 5a and 5b diagrammatically depict a cross-section of a system 1 of connected body elements 1, 4. In this exemplary embodiment, the attachment element 11 furthermore comprises an expandable material 13. In this case, the attachment element 11 with the expandable material 13 is configured in such a manner that the cross-section of the first body element 1 is thereby not completely closed. This makes it possible for in particular a deposition painting liquid to be able to circulate through the body elements (FIG. 5a).

After the deposition painting, the bodies are typically baked in an oven. The heat supplied in the process causes the expandable material 13 to foam. The expanded material 13' then closes the cross-section of the profiles such that, for example, an acoustic damping or damping against liquids can be achieved (FIG. 5b).

In addition, the adhesive 8 typically hardens because of the heat, and therefore after the body is baked in the oven, a hardened adhesive 8' is present (FIG. 5b).

FIGS. 6a to 6c show an exemplary process of introducing the adhesive 8 into an intermediate space between the first body element and the second body element. FIG. 6a shows a situation shortly after starting the introduction of the adhesive 8. FIG. 6b shows a situation in which the adhesive 8 already introduced has largely spread along the channel 3, into which at the same time new adhesive 8 is still being introduced. FIG. 6c finally shows a situation in which the adhesive 8 has been fully introduced into the intermediate space, and the first body element is bonded to the second body element in the proposed fashion.

The adhesive 8 is introduced into the channel 3 through a filling opening 2. The liquid adhesive 8 spreads largely in the direction of the channel 3 and flows at least partly onto the shoulder 6 of the first body element. Because the distance between the shoulder 6 and the opposite body element is smaller than the distance between a floor of the channel 3 and the opposite body element, the adhesive 8 cools more quickly in the region of the shoulder than in the region of the channel 3, and hardens as a result of this cooling. This leads to a self-sealing function of the adhesive 8 in the region of the shoulder 6. The system is here configured such that the adhesive 8 does not flow over the region of the shoulder 6, so the connection region 15 remains free from adhesive 8.

Also, in this exemplary embodiment, a test opening 5 is provided for checking the progress of spreading of the adhesive 8 in the intermediate region between the first body element and the second body element.

In FIGS. 6a and 6b, the adhesive 8 has not yet spread as far as the test opening 5. FIG. 6c however shows a situation in which the adhesive 8 fills the intermediate space between the first body element and the second body element in the proposed fashion, and thus reaches the test opening 5.

FIG. 7 shows a device for introducing the adhesive into the intermediate region between the first and second body elements (not visible on this depiction). A pump 25 conveys adhesive from an adhesive tank 24 through a filling opening 2 in the first body element into the intermediate space between the first and the second body element. In this exemplary embodiment, the attachment element for forming the channel is not visible because it is completely covered by the second body element 4.

LIST OF REFERENCE NUMERALS

1 First body element
2 Filling opening
3 Channel
4 Second body element
5 Test opening
6 Shoulder
7 Gap
8 Adhesive
8' Hardened adhesive
9 Distance between shoulder and second body element
10 Body
11 Attachment element
12 Cross strut
13 Expandable material
13' Expandable material
14 Pillar
15 Connection region
17 Channel width
18 Channel depth
21 Longitudinal axis
24 Adhesive tank
25 Pump
26 Shoulder width

The invention claimed is:

1. A system of connected body elements for a motor vehicle, the system comprising:
    a first body element;
    a second body element, wherein the body elements are arranged with respect to one another such that there is a gap between the body elements;
    an adhesive which is arranged at least partially in the gap and adhesively bonds the first body element to the second body element,
    wherein
    at least one attachment element is arranged on at least one of the body elements such that the attachment element divides the gap into a channel and a shoulder lying next to the channel,
    wherein the adhesive is arranged at least partially in the channel and at least partially on the shoulder, and wherein a connection region directly adjoining the shoulder is free of adhesive, and wherein the attachment element does not completely seal the gap between the body elements.

2. The system as claimed in claim 1, wherein the attachment element is formed from plastic.

3. The system as claimed in claim 1, wherein the attachment element is a pre-manufactured plastic, or
    wherein the attachment element is a plastic formed directly on the at least one body element.

4. The system as claimed in claim 1, wherein the first body element is a profile, a casting or a panel-shaped element, and wherein the second body element is a profile, a casting or a panel-shaped element.

5. The system as claimed in claim 1, wherein the first body element and/or the second body element consist at least partially of metal, plastic or fiber-reinforced plastic.

6. The system as claimed in claim 1, wherein a distance between the shoulder and the opposite body element is between 0.2 and 5 mm.

7. The system as claimed in claim 1, wherein the attachment element also comprises an expandable material for sealing a cross-section.

8. The system as claimed in claim 1, wherein the channel runs completely around the first body element and is thus closed in itself.

9. The system as claimed in claim 1, wherein a width of the shoulder, measured in the same direction as the channel width, is less than 30 mm.

10. A method for connecting body elements of a motor vehicle, the method comprising the steps:

provision of a first body element;

provision of a second body element;

arrangement of an attachment element on at least one of the body elements;

arrangement of the first body element and the second body element such that a gap is formed between the body elements, and that this gap is divided by the attachment element at least into a channel and a shoulder lying next to the channel;

introduction of an adhesive into the channel; and spreading of the adhesive at least partly in the channel and at least partly on the shoulder for bonding the first body element to the second body element, wherein the spreading of the adhesive is stopped on the shoulder.

11. The method as claimed in claim 10, wherein the spreading of the adhesive on the shoulder is stopped by an at least partial hardening of the adhesive on the shoulder.

12. The method as claimed in claim 10, wherein, during the arrangement of the attachment element, the attachment element is plugged onto the at least one body element, or wherein the attachment element is extruded onto the at least one body element.

13. The method as claimed in claim 10, wherein on introduction into the channel, the adhesive is conveyed from an adhesive tank by a pump, and/or wherein on introduction into the channel, the adhesive is conveyed through a filling opening in the first body element or in the second body element.

14. The method as claimed in claim 10, wherein the method comprises the step: hardening of the adhesive by application of a temperature of at least 120° C.

15. The method as claimed in claim 10, wherein the method is carried out with elements of the system.

* * * * *